United States Patent [19]

Demarest et al.

[11] B 3,940,343

[45] Feb. 24, 1976

[54] METHOD OF PREPARING HALOPHOSPHATE PHOSPHOR OF CONTROLLED PARTICLE SIZE

[75] Inventors: Donald J. Demarest, Butler; Herman R. Heytmeijer, Whippany, both of N.J.

[73] Assignee: Westinghouse Electric Corporation, Pittsburgh, Pa.

[22] Filed: Mar. 27, 1973

[21] Appl. No.: 345,390

[44] Published under the Trial Voluntary Protest Program on January 28, 1975 as document no. B 345,390.

[52] U.S. Cl. ................................ 252/301.4 P; 423/308
[51] Int. Cl.² ................................ C09K 11/42
[58] Field of Search .............. 252/301.4 P, 301.6 P; 423/308, 307

[56] References Cited
UNITED STATES PATENTS

| | | | |
|---|---|---|---|
| 3,099,627 | 7/1963 | Mooney et al. | 252/301.4 P |
| 3,242,369 | 3/1966 | King et al. | 252/301.4 P X |
| 3,395,979 | 8/1968 | Schafer | 423/308 |
| 3,635,660 | 1/1972 | Bruce et al. | 252/301.4 P X |

Primary Examiner—Jack Cooper
Attorney, Agent, or Firm—R. A. Stoltz

[57] ABSTRACT

A method of preparing a halophosphate phosphor of controlled particle size with includes the step of compacting the calcium hydrogen orthophosphate di-hydrate crystals. The steps in the method include precipitating the calcium hydrogen orthophosphate di-hydrate crystals from a fluid formed by mixing a calcium chloride solution or a calcium nitrate solution and a diammonium phosphate solution, separating the precipitated di-hydrate crystals from the remainder of the fluid, compacting the di-hydrate crystals, converting the di-hydrate into de-hydrate crystals, preparing a raw mix containing the de-hydrate crystals, and firing the raw mix to form the halophosphate phosphor. The di-hydrate crystals may be separated from the remainder of the fluid by filtering, in which case, the compacting is preferably achieved by pressing the crystals against the filter. The di-hydrate crystals may also be separated from the remainder of the fluid by centrifuging, in which case, the compacting is provided by the centripetal-centrifugal forces present during centrifuging. After centrifuging, the crystals must be deagglomerated.

3 Claims, 1 Drawing Figure

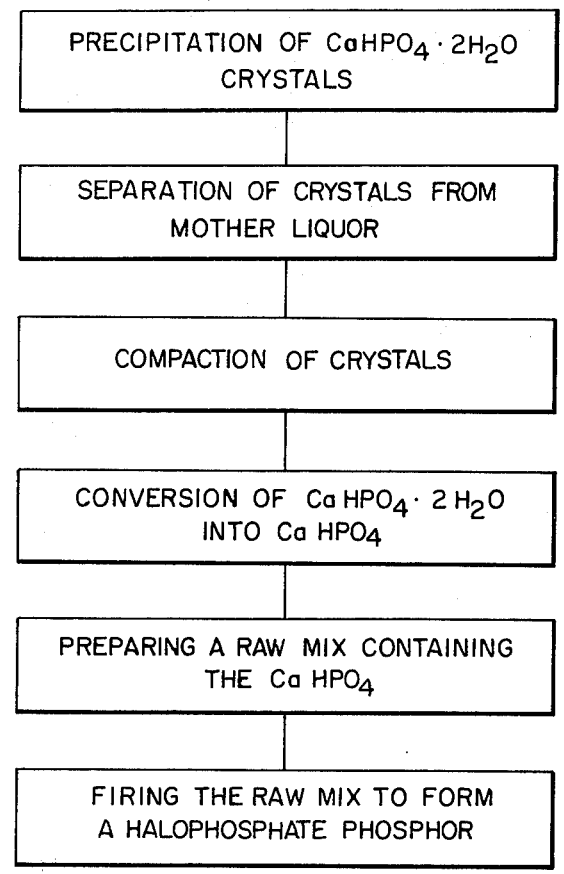

METHOD OF PREPARING HALOPHOSPHATE PHOSPHOR OF CONTROLLED PARTICLE SIZE

CROSS-REFERENCE TO RELATED APPLICATION

In copending application Ser. No. 345,173, filed concurrently herewith and owned by the present assignee, is described a process for the preparation of halophosphate phosphorus utilizing batch precipitation of $CaHPO_4$, in which precipitation the reactants are combined extremely rapidly.

BACKGROUND OF THE INVENTION

This invention relates to the manufacture of halophosphate phosphors such as are used in fluorescent lamps.

Typically, halophosphate phosphors have been prepared by firing a raw mix containing calcium hydrogen orthophosphate (which has been precipitated as a dihydrate and then converted to a de-hydrate), calcium carbonate, calcium fluoride, ammonium chloride, and suitable compounds of activator metals. The activators are generally antimony and manganese. It is well known to substitute other alkaline earth metals for some or all of the calcium. It is also well known that, in the preparation of such phosphors, the crystal properties of the phosphor are highly dependent upon the crystal properties of the calcium hydrogen orthophosphate and that good crystals of the proper range of sizes are essential to good performance of the phosphor in a lamp.

Generally, calcium hydrogen orthophosphate is precipitated in a di-hydrate form ($CaHPO_4 \cdot 2H_2O$) from a mixture of calcium chloride and diammonium phosphate solutions (calcium nitrate has occasionally been used in place of the calcium chloride). The precipitated crystals are generally collected and separated from the mother liquor (the mother liquor consists primarily of ammonium chloride solution together with any unreacted calcium chloride or diammonium phosphate) by filtration. The crystals may be washed at this time to provide further removal of the mother liquor. The di-hydrate crystals are then converted to de-hydrate (anhydrous calcium hydrogen orthophosphate) crystals by gently agitating the crystals in a warm (80°–100°C), slightly acidic solution (pH initially about 4.5). The crystals are then collected (typically by filtration), washed and dried and used as part of the raw mix which is fired to form the halophosphate phosphor.

The effects of precipitation conditions on the particle size of the final phosphor have been recognized in, for example, U.S. Pat. No. 3,242,369 issued to king, et al., on Mar. 22, 1960. Heretofore, however, it had apparently been assumed that filtering conditions did not have a significant effect on particle size and the main emphasis had been on gentle handling to avoid mechanical breaking of the crystals.

SUMMARY OF THE INVENTION

It has been discovered that the particle size of halophosphate phosphors is a function of the compaction to which the precipitated crystals are subjected. A halophosphate phosphor of controlled particle size is prepared by precipitating calcium hydrogen orthophosphate di-hydrate crystals from a fluid formed by mixing calcium chloride solution (or calcium nitrate solution) with diammonium phosphate solution, and separating the precipitated di-hydrate crystals from the remainder of the fluid. The separated di-hydrate crystals are then compacted (if separation is by centrifuging, the separation and compaction occur concurrently), the compacted di-hydrate crystals converted into de-hydrate crystals, and a phosphor raw mix which contains the de-hydrate crystals is fired to form the halophosphate phosphor. The di-hydrate crystals may be separated from the remainder of the fluid either by collecting the crystals on a filter or by centrifuging. When the di-hydrate crystals are separated by filtering, the compacting is preferably achieved by pressing the crystals against the filter. When the di-hydrate crystals are separated by centrifuging, the compacting is provided by the centrifugal forces present during centrifuging and an unusual additional step in which the crystals are deagglomerated is required.

BRIEF DESCRIPTION OF THE DRAWING

A better understanding of the invention will be obtained from the exemplary method described in the accompanying drawing, wherein:

The sole FIGURE of the drawing is a flow chart showing the steps in the production of a halophosphate phosphor, including the step of compacting the precipitated di-hydrate crystals prior to conversion into de-hydrate crystals.

DESCRIPTION OF THE PREFERRED EMBODIMENT

It has been discovered that the manner in which precipitated di-hydrate crystals are separated from the precipitation fluid has an effect on the particle size of the final halophosphate phosphor. This means not only that these conditions must be carefully controlled to prevent the introduction of changes which could result in production of phosphor of other than the desired particle size range, but also that the conditions during separation can be varied to control particle size. Thus, for example, conditions during separation can be varied to allow conditions elsewhere in the process to be run more nearly at optimum conditions. It should be noted that the final particle size of the phosphor is not only a function of the size of the particles of the de-hydrate crystals which are placed in the raw mix, but is also a function of the precipitated di-hydrate crystals. Thus, one can monitor the size of the precipitated di-hydrate crystals, for example, and make appropriate changes of the separating and compaction conditions to adjust the particle size in the desired direction.

As will be noted from the sole FIGURE, the first step in the preparation of a halophosphate in accordance with the present invention is the precipitation of calcium hydrogen orthophosphate di-hydrate crystals. This may be done either by continuous or batch precipitation. Typically, half-molar solutions of calcium chloride and diammonium phosphate are mixed at approximately room temperature. The present invention can be practiced, however, using, for example, the approximately 2 molar solutions at 30°–50°C. as taught in application Ser. No. 360,994, filed May 16, 1973 and owned by the present assignee.

Next, the precipitated di-hydrate crystals are separated from the mother liquor and compacted. The crystals can be simultaneously separated and compacted by centrifuging the crystals. Although both higher and lower centrifugal forces also provide the separation and compacting, it was found convenient to subject the crystals to a force of about 120–800 times the force of gravity. Centrifuging provides excellent control of particle size in that the degree of compacting can be conveniently controlled by controlling the speed of the centrifuge. A 24 inch diameter centrifuge can be used, for example, and is effective at speeds of 600–1,500 rpm. The crystals may also be washed in the centrifuge by introducing additional water during the centrifuging. Although centrifuging provides a convenient method of separating and compacting, deagglomeration of the compacted crystals is required in order to produce good phosphor crystals from di-hydrate which has been centrifuged. Although chemical methods of deagglomerating are known in the art, mechanical deagglomeration by stirring is preferred. When mechanical deagglomeration was attempted using slurries with a weight ratio of water to crystals of about 4–5 to 1, a wide range of crystal sizes was obtained. After conversion, the de-hydrate crystals deagglomerated in such dilute slurries ranged from approximately 2 microns by 6 microns up to 15 microns by 20 microns, (the crystals were measured by photographs taken through microscopes and, as the crystals tend to be relatively thin and lay flat in the photograph, the thickness or third dimension could not be conveniently measured, but was, in all cases herein described, approximately 1–5 microns). Desirably, the length and width (the two larger dimensions of the crystal) should be approximately equal, and the crystals should be relatively thin and uniform in size. It can be seen that the results of deagglomerating with dilute solutions were unsatisfactory. The results from centrifuging crystals which were not deagglomerated at all varied even more widely than the centrifuged crystals which were deagglomerated in a dilute solution. Conversely, crystals formed from cake which was deagglomerated in slurries having a weight ratio of di-hydrate crystals to water of about 0.6–1.5 to 1 provided crystals with length and width dimensions which were approximately equal (generally within 20 percent) and good uniformity from crystal to crystal (the largest dimension of about 90 percent of the crystals was within ±20 percent of the average). The use of approximately equal weight amounts of water and cake in the slurry also provides for convenience of monitoring the deagglomeration process. High shear mechanical stirring (such as is provided by a blender, a Morehouse Mill or a Cowles Dissolver) is required for deagglomeration. Initially the slurry is quite thick and when a blender, for example, is used for high shear mechanical stirring, the blender is quite heavily loaded for the first few seconds. However, as the high shear mechanical stirring is continued, there is a distinct lessening of the viscosity and the slurry turns into a thin, almost watery consistency (the viscosity drops from a value of over 1,000 centipoises to less than 10 centipoises). Generally, the high shear mechanical stirring is continued only for a few seconds after the thinning has occurred, but it has been found that continuing the high shear mechanical stirring for several minutes after the change in viscosity has occurred has no significant effect on either crystallinity or particle size. In addition to a blender, other means of mechanical stirring which produce the high shear mechanical stirring were also found to be satisfactory. The use of a Morehouse Mill or a Cowles Dissolver to provide vigorous agitation is known in the art, and both were found to provide satisfactory deagglomeration when approximately equal weights of water and crystals were used. As a larger number of variables exist in any of these methods of mechanical stirring, such as the size of the vessel, the speed and size of any mixing blades, the degree to which the vessel is filled, and the clearance of the discs in the Morehouse Mill, a large number of variations in the process is possible. One skilled in the art can, however, make appropriate adjustments to provide a process which does produce the distinct change in viscosity indicative of deagglomeration. Once optimized, conditions of deagglomeration should be carefully maintained, as these conditions do have a pronounced effect on the particle size of the final phosphor.

Centrifuging provides an especially well controlled method of removal of the mother liquor from the di-hydrate crystals. Experiments have shown that a more thorough removal of the mother liquor from the di-hydrate will result in a slightly smaller crystal size of the end product.

While the mother liquor cannot be as thoroughly removed by filtering, nor the crystals subjected to as closely a controlled degree of compacting (as compared to centrifuging), tests have shown that an adequate degree of control of crystal size can also be obtained by filtering and compacting. Filtering is quite convenient for a production process and does not require deagglomeration. The compacting should probably be provided in a definite time relation to the separation of the crystals from the liquor (typically, within 30 seconds of separation). While in centrifuging the compacting takes place essentially concurrently with the separation, in filtering the compacting generally takes place after the separation. The crystals should preferably be compacted against the filter. This can be provided for example by a roller which compacts the crystals against a drum or belt filter.

After the crystals have been precipitated, separated and compacted, the di-hydrate crystals are converted into de-hydrate crystals. This is typically done by stirring the di-hydrate crystals in a dilute acid solution at about 80–100°C. The acid solution can consist of, for example, a ratio of phosphoric or hydrochloric acid to deionized water of 1 to 1000. The crystals are stirred in the solution and the solution heated to about 95°C in approximately 40 minutes. After conversion, the crystals are separated from the conversion liquid, and may be washed and dried. The drying may be provided by heating (typically, 120–140°C).

The converted crystals are then mixed in a raw mix and fired to form a halophosphate phosphor. Typically, the raw mix contains, in addition to the calcium hydrogen orthophosphate de-hydrate crystals, ingredients such as calcium fluoride, ammonium chlorides, calcium carbonates, and oxides or phosphates of activators such as manganese and antimony. Other alkaline earth metals may be substituted in whole or in part for the calcium. The foregoing is merely for purposes of illustration as preparation of raw mix is well known in the art.

Typically, little attention has been paid to the steps between precipitation of the crystals and conversion of the crystals. As it has been found that these steps have significant effect on crystal size and, in particular, that compacting the crystals during or after separation provides a practical method for maintaining control over crystal sizes and results in both uniform crystals being produced at one point in time and a reproducible size of crystals.

All conditions of separation and compacting and, if required, deagglomerations, should be carefully controlled to prevent the introduction of random variations in particle size. One or more of the conditions can also be intentionally varied to adjust particle size. One such condition which can be conveniently varied is the weight ratio of di-hydrate crystals to water during deagglomeration. This ratio is raised to reduce particle size. Another condition which can be controlled to control particle size is the rate at which the precipitated di-hydrate slurry (which contains the mother liquor) is introduced into the centrifuge. It has been found the higher the rate of introduction, the larger the particle size. For example, when 91 gallons of 0.5 molar di-hydrate slurry were pumped into a 24 inch centrifuge rotating at 1,000 rpm, a feed rate of approximately 6.5 gallons per minute produced crystals of about 15–18 microns (when measured on the longer of the two larger dimensions) and a feed rate of approximately 4.8 gallons per minute produced crystals of about 11–14 microns.

It should be noted that the deagglomeration conditions for most uniform particle size are a function of the compaction applied during centrifuging. For example, when the dehydrate is centrifuged in a 24 inch diameter centrifuged at 1,500 rpm, maximum effectiveness was obtained with a relatively low slurry level in the deagglomeration vessel. However, di-hydrate centrifuged at 1,000–1,200 rpm was found to be more effectively deagglomerated using a higher level of slurry during deagglomeration.

Phosphors were generally made using the following procedure. The di-hydrate precipitate was prepared by adding a half-molar diammonium phosphate solution to a half-molar calcium chloride solution in approximately 4 minutes. The calcium chloride solution had been adjusted to a pH of 5 and was maintained in strongly turbulent agitation during the addition of the diammonium phosphate and for 10 minutes thereafter. The temperature of the solutions was kept at about 23°C. The precipitations were carried out in a 180 liter precipitator wherein 86.4 liters of calcium chloride and 80 liters of diammonium phosphate solution were mixed. After completion of the precipitation, the crystals were separated in the manner to be evaluated (centrifuging or filtering). Calcium nitrate can be used in place of the calcium chloride, but calcium chloride is preferred.

The compacting force was varied. Centrifuging force was varied from about 120–800 times the force of gravity. After centrifuging, the packed crystals were deagglomerated, generally in slurries containing approximately equal parts by weight di-hydrate crystals and water. When the crystals were separated by filtering rather than centrifuging, compacting was done by pressing the crystals. Generally, the crystals were pressed against the filter. No deagglomeration was needed when the crystals were filtered and compacted rather than centrifuged.

For conversion, the di-hydrate crystals were reslurried in a solution containing 3,700 milliliters of water and 3.3 milliliters of phosphoric acid. This slurry was then heated to 95°C in about 40 minutes.

The raw mix is prepared in the conventional manner and may contain, for example, the following: 225 grams of $CaHPO_4$ produced according to the instant invention, 21.5 grams of $CaF_2$, 8.8 grams of $Sb_2O_3$, 11 grams of $MnCO_3$, 76.4 grams of $CaCO_3$, 7.65 grams of $NH_4Cl$, and 5.4 grams of CaCl. The raw mix is fired in the conventional manner, for example, at about 1,200°C for approximately 6 hours.

It will be noted that the compaction and the high shear mechanical stirring to provide deagglomeration of the centrifuged cake are quite novel as the prior art had taught that treatments such as compaction and especially high shear mechanical stirring would lead to mechanical breaking of the crystals.

It will be understood that, although such phosphors of controlled particle size may most generally be used either as the sole phosphor or in mixtures with other phosphors in low pressure mercury vapor fluorescent electric discharge devices, these phosphors may also be used in other devices for which halophosphate phosphors are suitable, such as cathode ray tubes.

We claim as our invention:

1. An improved method of preparing halophosphate phosphor of controlled particle size by controlling the preparation of calcium hydrogen orthophosphate raw mix ingredient, said method comprising:
   a. precipitating calcium hydrogen orthophosphate di-hydrate crystals from a fluid formed by mixing a calcium chloride solution with a diammonium phosphate solution;
   b. separating said precipitated di-hydrate crystals from the remainder of said fluid;
   c. compacting said di-hydrate crystals by centrifuging, wherein said centrifuging subjects said crystals to a force of about 120–800 times the force of gravity for 5–200 seconds, said separating and compacting occurring concurrently;
   d. deagglomerating said compacted crystals, wherein said deagglomeration is performed by high shear mechanical stirring of a slurry comprising said di-hydrate crystals and water, and the weight ratio of di-hydrate crystals to water is about 0.6–1.5, and said mechanical agitation is performed for a sufficient time to provide a distinct lessening of viscosity during said agitation;
   e. converting said di-hydrate crystals into anhydrous calcium hydrogen orthophosphate crystals;
   f. preparing a raw mix comprising said anhydrous calcium hydrogen orthophosphate crystals; and
   g. firing said raw mix to form said halophosphate phosphor.

2. The method of claim 1, wherein the weight ratio of di-hydrate crystal to water in (d) is adjusted to adjust particle size, with said ratio being raised to reduce said particle size or lowered to increase the particle size.

3. The method of claim 1, wherein said precipitated di-hydrate and remainder of said fluid are introduced into the centrifuge at a controlled rate to control said particle size, with the rate of introduction being raised to increase said particle size or lowered to reduce the particle size.

* * * * *